United States Patent
Ramsay

(10) Patent No.: US 7,735,910 B2
(45) Date of Patent: Jun. 15, 2010

(54) PLASMA WIND DEFLECTOR FOR A SUNROOF

(75) Inventor: Thomas Ramsay, Worthington, OH (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/684,605

(22) Filed: Mar. 10, 2007

(65) Prior Publication Data

US 2008/0217965 A1    Sep. 11, 2008

(51) Int. Cl.
    *B60J 7/22* (2006.01)
(52) U.S. Cl. ................................. 296/217; 180/903
(58) Field of Classification Search .................. 296/217; 180/903
    See application file for complete search history.

(56) References Cited

U.S. PATENT DOCUMENTS

| | | | |
|---|---|---|---|
| 3,510,094 A * | 5/1970 | Clark ...................... 244/130 |
| 3,662,554 A | 5/1972 | De Broqueville |
| 4,864,141 A | 9/1989 | Lewiner |
| 4,867,503 A | 9/1989 | Luksch et al. |
| 5,052,638 A | 10/1991 | Minovitch |
| 5,734,727 A | 3/1998 | Flaherty et al. |
| 6,174,025 B1 | 1/2001 | Henderson, III et al. |
| 6,378,932 B1 | 4/2002 | Fasel et al. |
| 6,513,867 B1 | 2/2003 | Bess et al. |
| 6,523,889 B2 | 2/2003 | Bindorfer et al. |
| 6,527,221 B1 | 3/2003 | Kremeyer |
| 6,601,570 B2 | 8/2003 | Zetmeir |
| 6,824,205 B2 | 11/2004 | Cooney et al. |
| 6,877,800 B2 | 4/2005 | Maeta et al. |
| 6,910,733 B2 | 6/2005 | Raasakka |
| 6,971,170 B2 | 12/2005 | Raasakka et al. |
| 6,991,280 B2 | 1/2006 | McKnight et al. |
| 7,017,863 B2 | 3/2006 | Scott et al. |
| 2004/0096375 A1 | 5/2004 | Cesa |
| 2008/0067283 A1 | 3/2008 | Thomas |
| 2008/0122252 A1 | 5/2008 | Corke et al. |

OTHER PUBLICATIONS

Brown, Clifford A. Scalability of Localized Arc Filament Plasma Actuators, NASA Techinical Memorandum, Jan. 7, 2008, 20 pages, NASA/TM-2008-215278, National Aeronautics and Space Administration Washington, DC. Note: submitted to provide the examiner with background information regarding the relevant art. Submittal of this reference by applicant does not constitute and admission as prior art.

Corke, Thomas C., Flint O. Thomas, and Michael J. Klapetzky. Use of Plasma Actuators as a Moving-Wake Generator, NASA Final Contractor Report, Jan. 2007, 172 pages, NASA/CR-214676, National Aeronautics and Space Administration, Washington, DC.

* cited by examiner

*Primary Examiner*—Dennis H Pedder
(74) *Attorney, Agent, or Firm*—Mark Duell; Michael A. Forhan; Eley Law Firm Co.

(57) ABSTRACT

A wind deflector for a sunroof. The wind deflector includes a first electrode proximate an edge of a sunroof opening. A second electrode is proximate the first electrode. An insulator is intermediate the first and second electrodes. A power supply is coupled to the first and second electrodes. An electrical signal generated by the power supply is coupled to the first and second electrodes. An electric field generated between the electrodes due to the electrical signal ionizes air proximate the electrodes, thereby deflecting an air flow field away from the sunroof opening.

12 Claims, 3 Drawing Sheets

PLASMA WIND DEFLECTOR FOR A SUNROOF

FIELD

The present invention relates generally to wind deflectors for vehicles, and in particular to a wind deflector that utilizes an electric field proximate a sunroof opening to deflect an air flow field away from the opening.

BACKGROUND

A sunroof is a popular accessory item for a motor vehicle. The sunroof typically includes a closure panel that is movable relative to an opening formed through a roof of the vehicle. The closure panel is movable between a closed position generally flush with the roof that completely covers the opening, and an open position rearward of the closed position for allowing ventilation and/or sunlight to enter a passenger compartment of the vehicle. In addition, the closure panel is typically positionable at one of a plurality of partially open positions between the closed and open positions. The closure panel, which may be moved manually or via an electric motor, is retracted into the structure of the roof when open, where it is hidden from view.

Many sunroof assemblies have a shortcoming wherein noise is transmitted into the vehicle passenger compartment when the closure panel is in an open position, due to the flow of air proximate the sunroof opening. One component of the wind noise, commonly termed "buffeting" or "wind throb," results from air rushing over an opening in a cavity and is generally characterized by relatively low-frequency noise. Another component of wind noise typically results from air rushing by or into obstructions at higher vehicle speeds and is generally characterized by high-frequency noise.

In an effort to attenuate the low frequency portion of the wind noise, wind deflectors have frequently been incorporated into sunroof assemblies. These wind deflectors may be fixed, or may pivot from a retracted position when the sunroof closure panel is closed to an extended position when the sunroof closure panel is opened. While fixed wind deflectors have been employed with some success, there is an inherent tradeoff in configuring a wind deflector to be effective in attenuating low-frequency noise while not generating high-frequency noise. For example, although the wind deflector can be configured to deflect the air beyond the sunroof opening to decrease wind throb, at higher vehicle speeds the deflector itself can generate high-frequency wind noise.

Pivotable wind deflectors that are manually or automatically adjustable are more effective to attenuate low- and high-frequency wind noise. Examples of such wind deflectors may be seen by reference to U.S. Pat. Nos. 6,523,889 and 6,174,025. However, such mechanical systems are complex, thereby increasing their cost and reducing their overall reliability. There is a need for a wind deflector that is effective to attenuate low- and high-frequency wind noise without resorting to complex mechanical systems.

SUMMARY

The present invention utilizes an electric field to deflect the air flow field over a sunroof opening to counteract wind noise, thereby eliminating the need for a mechanical sunroof deflector and an associated deployment mechanism. Two electrodes separated by a dielectric are positioned along the front of the sunroof opening. A high-voltage signal is applied to the electrodes, causing a weak ionization of the air proximate the electrodes. The ionized air deflects the local air flow field away from the sunroof opening by the induced magnetic field, thereby limiting wind throb. In some embodiments the system may be configured to detect wind throb and activate only when needed.

An object of the present invention is a wind deflector for a sunroof. The wind deflector includes a first electrode proximate an edge of a sunroof opening. A second electrode is proximate the first electrode, and an insulator is intermediate the first and second electrodes. An electrical signal is generated by a power supply connected to the first and second electrodes. An electric field generated between the electrodes due to the electrical signal ionizes air proximate the electrodes, thereby deflecting an air flow field away from the sunroof opening.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
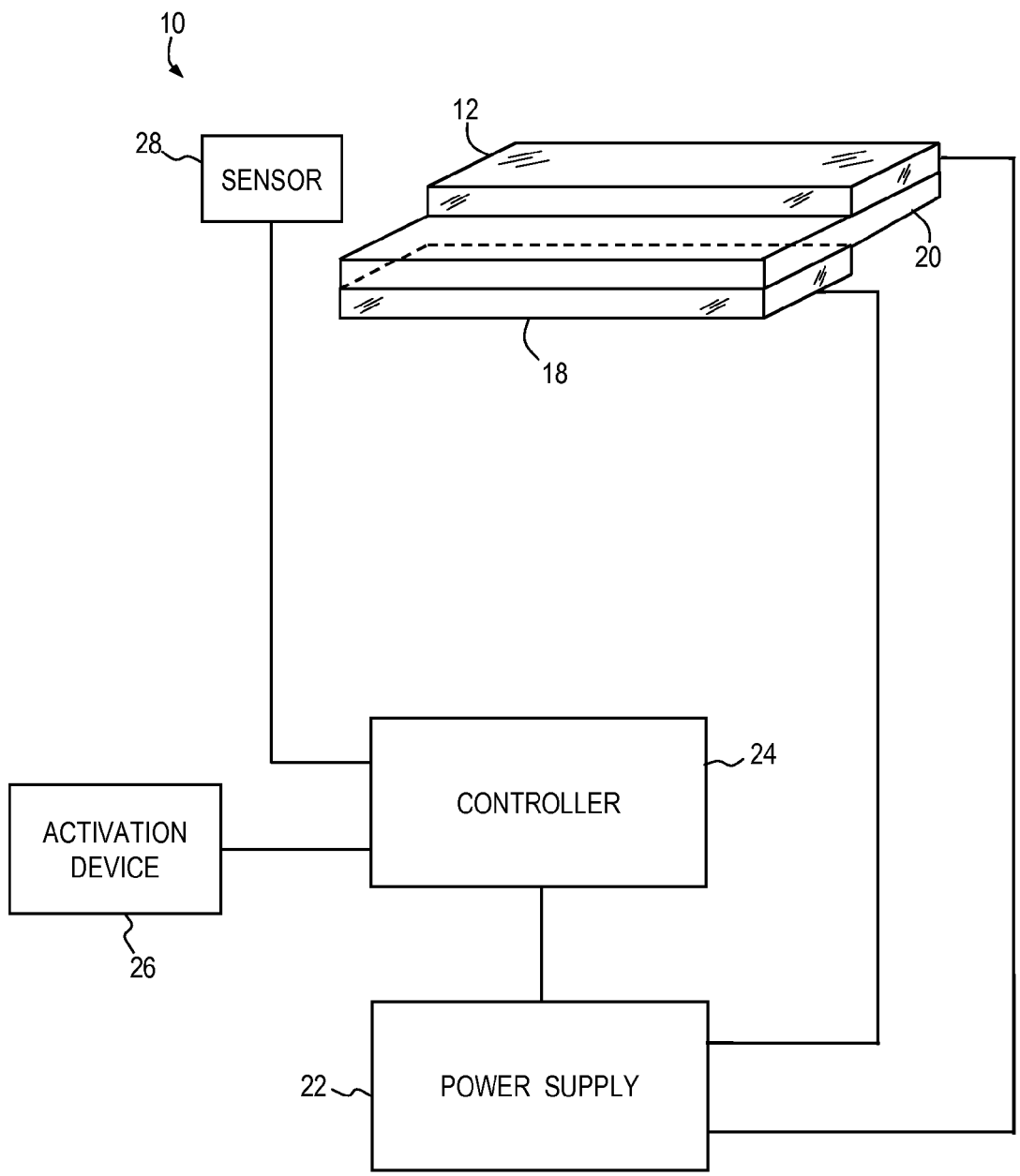
FIG. 1 is a schematic diagram of a wind deflector for a sunroof according to an embodiment of the present invention.
Figure 2:
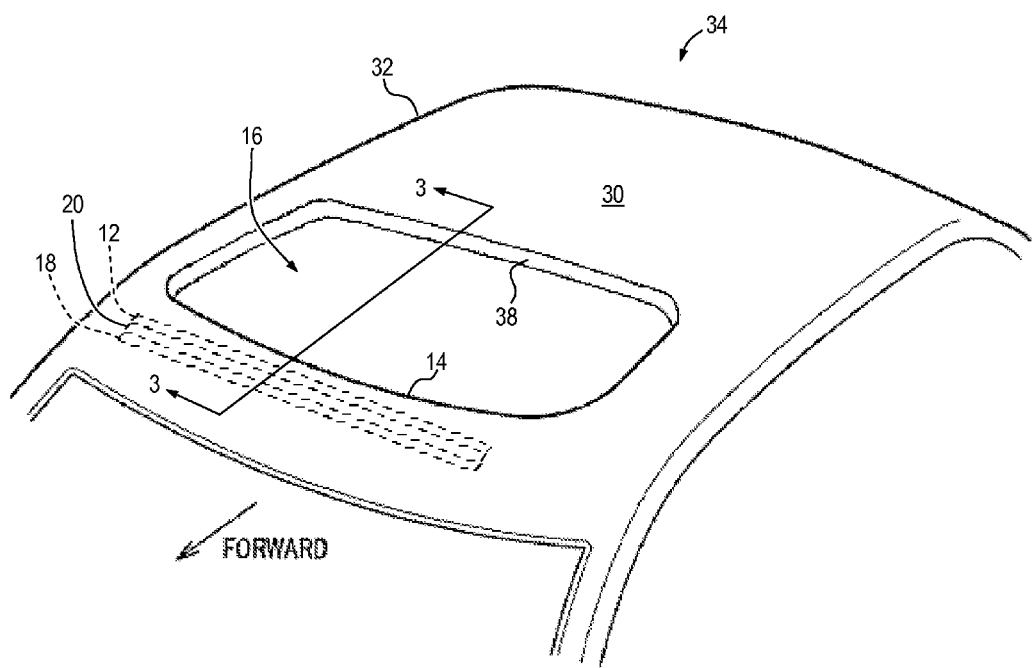
FIG. 2 shows a sunroof opening of a vehicle and the general arrangement of an assembly for a wind deflector, according to an embodiment of the present invention.

The general arrangement of a sunroof wind deflector 10 is shown in FIGS. 1 and 2. Wind deflector 10 comprises a first electrode 12 that is proximate a forward edge 14 of a sunroof opening 16. A second electrode 18 is proximate first electrode 12. An insulator 20 is intermediate first electrode 12 and second electrode 18. The output of a power supply 22 is coupled to electrodes 12, 18. A controller 24 controls operation of power supply 22 and other components of wind deflector 10, as will be further detailed below. An activation device 26, coupled to controller 24, selectably switches wind deflector 10 between inactive and active modes. A sensor 28, located proximate electrodes 12, 18, provides controller 24 with information relating to the operation of wind deflector 10.

Figure 3:
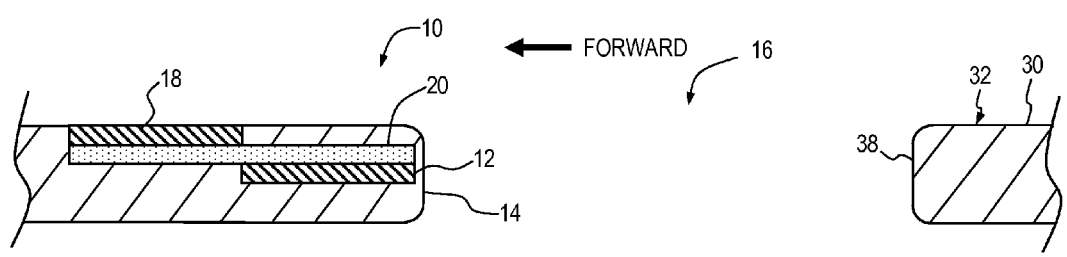
FIG. 3 is a view in section of the sunroof opening and the electrodes of FIG. 2.

Referring now to FIGS. 1, 2 and 3 in combination, electrodes 12, 18 are generally planar and are positioned generally parallel with respect to each other and to forward edge 14 of sunroof opening 16. In addition, electrodes 12, 18 may be vertically offset from each other and separated by the insulator 20, as shown in FIG. 3, or may be generally level with each other and separated by the insulator. Furthermore, electrodes 12, 18 typically have a length generally corresponding to the width of front edge 14 of the sunroof opening 16, but may be a greater or shorter length if desired. Electrodes 12, 18 are positioned generally proximate or level with a top surface 30 of a roof 32 of a vehicle 34 with the first electrode 12 and insulator 20 exposed to the air.

Electrodes 12, 18 may be made from any type of conductive material suitable for use with wind deflector 10 and the expected environment including, without limitation, silver, copper, aluminum, zinc, steel and brass. In addition, electrodes 12, 18 may be formed in any conventional manner including, but not limited to, casting, machining, forming, molding and stamping. Furthermore, electrodes 12, 18 may be finished and/or electrically insulated in any conventional manner, such as painting, coating or plating, or may be left unfinished and/or uninsulated. In some embodiments electrodes 12, 18 may be non-planar. For example, the electrodes may be formed from cylindrical rods or have a polygonal shape.

Insulator 20 is intermediate electrodes 12, 18 and functions to prevent a dielectric breakdown between the electrodes. Insulator 20 may separate electrodes 12, 18 vertically, as shown in FIG. 3, or may be placed between adjacent electrodes if the electrodes are level with each other. Insulator 20 may be made from any type of insulative material suitable for use with wind deflector 10 and the expected environment including, without limitation, glass, plastic, ceramic, natural and synthetic rubber, porcelain, mica, composites and alumina. In addition, insulator 20 may be formed in any conventional manner including, but not limited to, casting, machining, forming, molding, spinning and stamping. Furthermore, insulator 20 may be finished in any conventional manner, such as painting, coating or plating, or may be left unfinished.

Power supply 22 generates one or more of a high-voltage steady-state direct current (DC), pulse width modulated DC (PWM), alternating current (AC), or radio frequency (RF) electrical output signal having a predetermined magnitude, waveshape and duty cycle sufficient to ionize air proximate electrodes 12, 18. In some embodiments of the present invention power supply 22 may utilize the electrical system of vehicle 34 as an input power source for conversion to an electrical signal having the desired characteristics. DC, AC and RF power supplies are well-known in the art and thus will not be further detailed herein.

Controller 24 receives status signals from any or all of power supply 22, activation device 26 and sensor 28, and controls the operation of wind deflector 10 in a predetermined manner. Example control tasks for controller 24 may include, without limitation, activating and deactivating power supply 22 and adjusting the output voltage of the power supply. Controller 24 may also detect fault conditions with the components of wind deflector 10 and/or interconnections thereof. Non-limiting example fault conditions may include internal faults within power supply 22, open or shorted electrical connections, low input power supply voltage to wind deflector 10, and a dielectric breakdown between electrodes 12, 18. Controller 24 may be configured using conventional analog or digital circuitry or a combination thereof, and may utilize conventional memory devices such as magnetic, electronic and optical memory storage devices containing a predetermined set of instructions, such as a computer program.

Activation device 26 is utilized to engage and disengage wind deflector 10. In some embodiments of the present invention activation device may be an ON/OFF switch in the passenger compartment that allows an occupant to selectably control the operation of the wind deflector. Alternatively, activation device 26 may be located proximate sunroof opening 16 and contain detecting devices, such as audio pickups, vibration sensors, velocity indicators and pressure transducers to detect and/or quantify wind noise. Thus, if certain types of wind noise such as wind throb are detected, activation device 26 may change its state, automatically signaling controller 24 to activate power supply 22 to limit wind throb proximate sunroof opening 16.

In still other embodiments of the present invention activation device 26 may be a variable control wherein the electrical output signal generated by power supply 22 is manually adjusted by an occupant of the vehicle and/or automatically adjusted by controller 24 to any selectable value within a predetermined range in order to limit wind noise proximate sunroof opening 16. For example, activation device 26 may be variably adjusted to provide an analog or digital signal to controller 24 representing a desired electrical output signal for power supply 22 within a predetermined range of electrical signal voltages. Controller 24 in turn provides power supply 22 with an analog or digital command signal representing a predetermined output electrical signal voltage for the power supply, corresponding to the setting of activation device 26. Alternatively, the variable-control activation device 26 may be directly coupled to power supply 22 to establish a desired electrical output signal for the power supply within a predetermined range of electrical signal voltages.

Sensor 28 provides controller 24 with information relating to the operation of wind deflector 10. In various embodiments of wind deflector 10 sensor 28 may include one or a plurality of sensing devices including, without limitation, audio pickups, vibration sensors, velocity indicators and pressure transducers.

With reference again to FIG. 1 in combination with FIGS. 4A and 4B, the operation of an example embodiment of wind deflector 10 will be described. When wind deflector 10 is in an inactive state an air flow field, shown generally as 36 in FIG. 4A, flows proximate sunroof opening 16. At critical speeds, an oscillating shear layer is created between the air rushing over the sunroof and the standing air within the compartment that can result in wind throb noises at lower vehicle speeds. To counter this wind noise an occupant of the vehicle may engage activation device 26, such as a dash-mounted ON/OFF switch, to activate wind deflector 10. Controller 24 receives an activation signal from activation device 26 and, in turn, activates power supply 22 to begin generating an electrical signal having predetermined characteristics, such as voltage, frequency, duty cycle and waveshape. The electrical signal is coupled to electrodes 12, 18, the resulting potential between the electrodes causing a slight ionization of the air proximate the electrodes. The ionized air within the created magnetic field, represented as upward arrows 40 in FIG. 4B, act to deflect the air flow 36 upwardly and away from sunroof opening 16, thereby deterring formation of an oscillating shear layer and limiting wind throb noises.

Figure 4A:
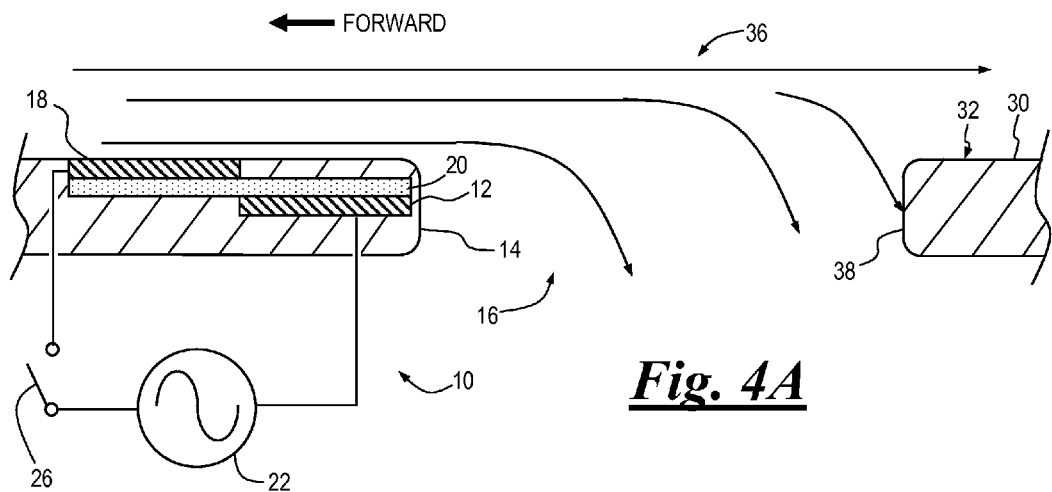
FIG. 4A is a diagram showing an air flow field over a sunroof opening with a wind deflector in an inactive state according to an embodiment of the present invention.
Figure 4B:
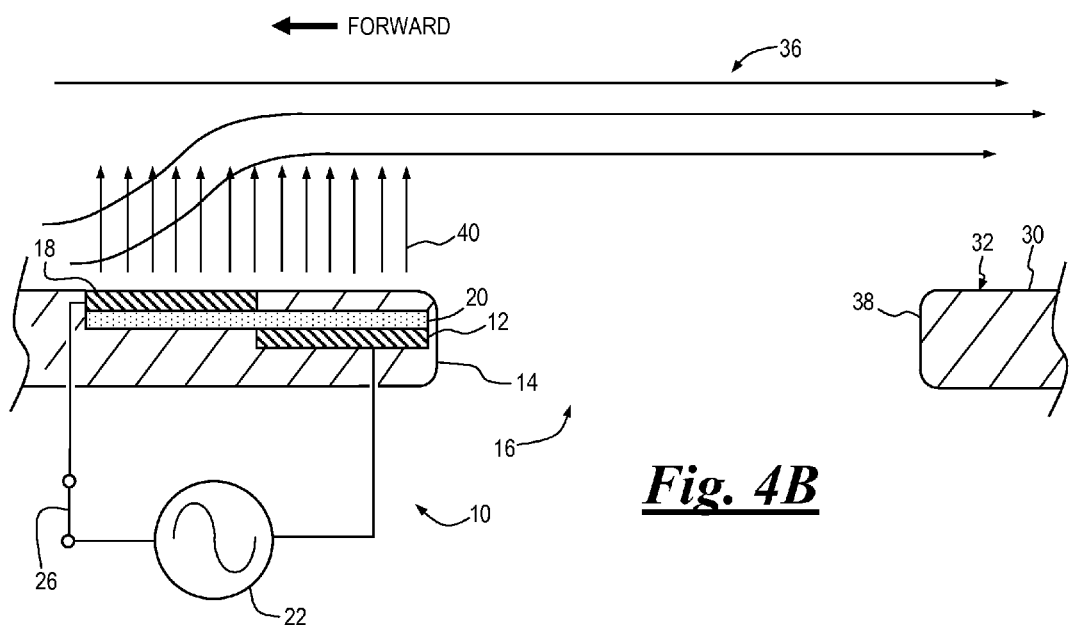
FIG. 4B is a diagram showing an air flow field over a sunroof opening with a wind deflector in an active state according to an embodiment of the present invention.

With continued reference to FIGS. 1, 4A and 4B, in some embodiments of the present invention controller 24 may utilize sensor 28 to control or tailor the output of power supply 22 in a predetermined manner to match the status of the sensor. Controller 24, in response to the status of sensor 28, may command power supply 22 to variably alter its electrical signal characteristics, i.e., voltage, waveshape, frequency, duty cycle and so on, in response to the sensed conditions, in order to minimize or eliminate wind throb. For example, it may be necessary to change some characteristics of the electrical signal to compensate for variations in vehicle speed, air temperature, humidity and air density.

With continued reference to FIGS. 1, 4A and 4B, in other embodiments of the present invention activation device 26 may be utilized to manually enable, but not activate wind deflector 10. In these embodiments an occupant of vehicle 34 may manually operate an activation device 26 such as an ON/OFF switch to signal controller 24 to enable operation of wind deflector 10. Subsequently, signals provided to controller 24 by sensor 28, such as an audio or vibration signal, is utilized by the controller to determine whether objectionable wind throb is present at sunroof opening 16. While wind deflector 10 is enabled by activation device 26 and a predetermined wind throb condition 36 is present, controller 24 will activate power supply 22 and tailor the electrical signal of the power supply in any manner previously discussed so as to limit the wind throb.

With continued reference to FIGS. 1, 4A and 4B, in still other embodiments of the present invention activation device 26 may be configured to automatically provide an enablement signal to controller 24. For example, activation device 26 may automatically send an enablement signal to controller 24 any time sunroof opening 16 is exposed by retraction or removal of a sunroof closure panel (not shown), exposing sunroof opening 16. Alternatively, activation device 26 may include detection devices similar to those discussed above for sensor 28 and provide an enablement signal to controller 24 when a predetermined noise condition is detected, without directly monitoring whether or not sunroof opening 16 is exposed. Once enabled, controller 24 monitors the status of sensor 28 and automatically activates and tailors the electrical signal of power supply 22 in any manner previously discussed so as to limit the wind throb.

With reference to FIG. 1, in yet another embodiment of the present invention sensor 28 and controller 24 may be deleted from wind deflector 10, activation device 26 being directly coupled to power supply 22. In this configuration activation device 26 is utilized to activate power supply 22, the power supply operating in a predetermined manner to provide an electrical signal to electrodes 12, 18. Absent controller 24 and sensor 28, wind deflector 10 may still incorporate certain control functions. For example, power supply 22 may include voltage regulation, current limiting and internal fault detection.

While this invention has been shown and described with respect to a detailed embodiment thereof, it will be understood by those skilled in the art that changes in form and detail thereof may be made without departing from the scope of the claims of the invention. For example, one skilled in the art will recognize that certain components of the wind deflector, such as electrodes 12, 18, may include safety devices such as interlocks and/or be safeguarded by a suitable structure configured to prevent the vehicle's occupants from being exposed to high-voltage components of wind deflector 10.

What is claimed is:

1. A wind deflector system for counteracting wind throb noise due to air flow across a vehicle sunroof opening, comprising:
    a first electrode proximate an edge of the sunroof opening;
    a second electrode proximate the first electrode;
    an insulator intermediate the first and second electrodes;
    a power supply coupled to the first and second electrodes;
    a controller coupled to the power supply and configured to selectably activate the power supply; and
    a sensor located proximate the opening and coupled to the controller, the controller receiving information from the sensor and activating the power supply responsive to the information provided by the sensor,
    wherein an electrical signal generated by the power supply is provided to the first and second electrodes when the power supply is activated, the resulting potential between the electrodes ionizing air proximate the electrodes, the ionized air influencing air flow across the opening to counteract wind throb in a passenger compartment of the vehicle.

2. The system of claim 1, further comprising an activation device coupled to the controller and configured to selectably activate the system.

3. The system of claim 2 wherein the activation device is one of an ON/OFF switch and a variable control.

4. The system of claim 1 wherein the sensor is a vibration sensor.

5. The system of claim 1 wherein the sensor is an audio pickup device.

6. The system of claim 1, further comprising an activation device coupled to the controller and configured as a detecting device to automatically enable the system, whereupon the controller receives information from the sensor and automatically activates the power supply in a predetermined manner responsive to the information provided by the sensor.

7. The system of claim 1 wherein the power supply generates a high voltage alternating current signal.

8. A wind deflector system for counteracting wind throb noise due to air flow across a vehicle sunroof opening, comprising:
    a first electrode proximate an edge of the sunroof opening;
    a second electrode proximate the first electrode;
    an insulator intermediate the first and second electrodes;
    a high voltage alternating current power supply coupled to the first and second electrodes;
    a controller coupled to the power supply and configured to selectably activate the power supply; and
    a sensor comprising at least one of a vibration sensor and an audio pickup device located proximate the opening and coupled to the controller, the controller receiving information from the sensor and activating the power supply responsive to the information provided by the sensor,
    wherein an electrical signal generated by the power supply is provided to the first and second electrodes when the power supply is activated, the resulting potential between the electrodes ionizing air proximate the electrodes, the ionized air influencing air flow across the opening to counteract wind throb noise in a passenger compartment of the vehicle.

9. The system of claim 8, further comprising an activation device coupled to the controller and configured to selectably activate the system.

10. A method for counteracting wind throb noise due to air flow across a vehicle sunroof opening, comprising the steps of:
    positioning a first electrode proximate an edge of the sunroof opening;
    positioning a second electrode proximate the first electrode;
    placing an insulator intermediate the first and second electrodes;
    coupling a power supply to the first and second electrodes,
    coupling a controller to the power supply, the controller being configured to selectably activate the power supply;
    locating a sensor proximate the opening; and
    coupling the sensor to the controller, the controller receiving information from the sensor and activating the power supply responsive to the information provided by the sensor,
    wherein an electrical signal generated by the power supply is provided to the first and second electrodes when the power supply is activated, the resulting potential between the electrodes ionizing air proximate the electrodes, the ionized air influencing air flow across the opening to counteract wind throb noise in a passenger compartment of the vehicle.

11. The method of claim 10, further comprising the step of coupling an activation device to the controller and configuring the activation device to selectably activate the system.

12. The method of claim 10, further comprising the step of configuring the power supply to generate a high voltage alternating current signal.

\* \* \* \* \*